United States Patent Office 3,317,249
Patented May 2, 1967

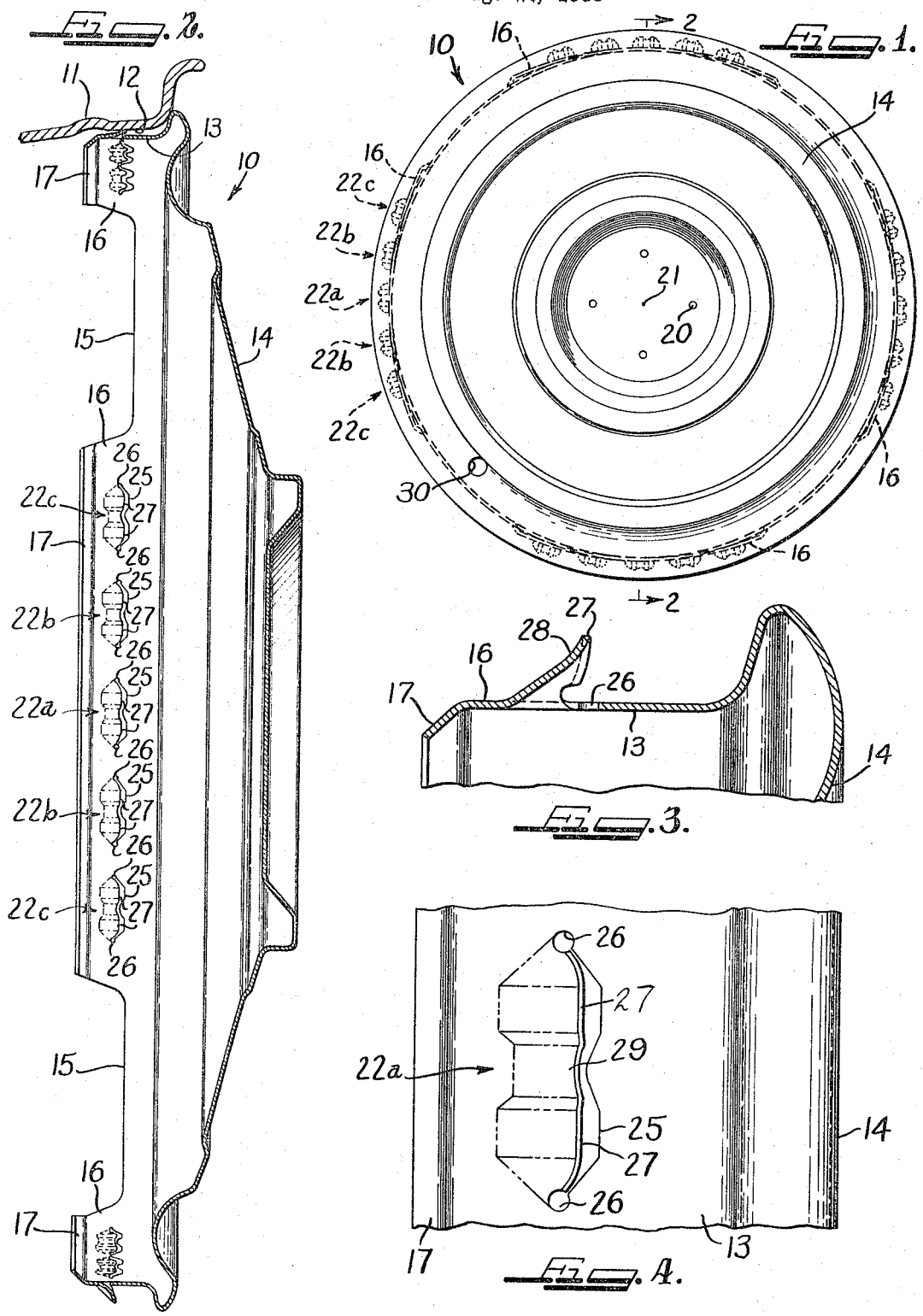

3,317,249
WHEEL COVER
Henri A. L. Dagobert, Valdosta, Ga., assignor to Thompson Industries, Inc., Indianapolis, Ind., a corporation of Massachusetts
Filed Aug. 20, 1965, Ser. No. 481,205
7 Claims. (Cl. 301—37)

This invention relates to wheel covers for automobiles.

Among the objects of this invention are: To provide an improved wheel cover that can be readily and economically manufactured; to arrange retention elements on extensions from an integral flange on the wheel cover that engage a tire rim and hold the cover securely in place in an improved manner; to position the retention carrying extensions along arcs the radii of which are greater than the radius of the flange carrying the extensions; and to relieve the stress in the extensions at the ends of the line along which each retention element is severed therefrom. Other objects will be apparent as the description proceeds.

In the drawings: FIG. 1 is a front elevational view of a wheel cover embodying this invention; FIG. 2 is a view, at an enlarged scale, taken generally along the line 2—2 of FIG. 1, and in addition showing in the upper portion how the wheel cover is applied to a tire rim a portion of which is shown in section; FIG. 3 is an enlarged sectional view of the upper portion of the wheel cover shown in FIG. 2 in the unstressed condition; FIG. 4 is a top plan view of the elemental showing in FIG. 3.

FIG. 1 shows at 10 a wheel cover formed of relatively thin sheet metal that is arranged to be applied to a tire rim a portion of which is indicated at 11 in FIG. 2. The tire rim 11 has an inner circular surface 12 for receiving the wheel cover 10. The wheel cover 10 has an annular flange 13 formed integrally with the body 14 thereof, the flange 13 having a diameter which is slightly less than the diameter of the circular surface 12. The annular flange 13 is bent from the body 14 and is axially directed therefrom so as to provide a generally cylindrical configuration. The body 14 can have various design configurations.

FIG. 2 shows the annular flange 13 as having along its free edge flat bottomed cut away sections 15 between extensions 16 of which four are shown. The marginal edges 17 of the extensions 16 are turned inwardly to provide a more rigid construction.

FIG. 1 shows the extensions 16 as being located along arcs with the center of the arc along which the extension 16, shown to the left of the drawing, extends being indicated at 20 and spaced somewhat to the right of the center 21 of the annular flange 13 or of the body 14. Thus the radius of the arc along which each of the extensions 16 is located is substantially greater than the radius of the annular flange 13.

Each of the extensions 16 has retention elements 22a, 22b and 22c struck outwardly therefrom, there being one retention element 22a, two retention elements 22b and two retention elements 22c. In the unstressed position when the wheel cover 10 is not applied to the tire rim 11, the retention elements 22b at the ends are positioned radially somewhat further from the center 21 than are the intermediate retention elements 22b which, in turn, are slightly further radially spaced from the center 21 than is the center retention element 22a. This arrangement provides for increased frictional engagement with the inner circular surface 12 of the tire rim 11 and thus serves to more effectively hold the wheel cover 10 in position thereon.

FIGS. 3 and 4 show that the retention elements are struck from the respective extensions 16 along an irregular line 25 at the ends of which apertures 26 are formed to relieve the stress and reduce likelihood of tearing of the metal. Each retention element includes a pair of spaced edge portions 27 that are arranged to bitingly engage the inner circular surface 12. The frictional engagement is improved by providing a slightly concave configuration 28 to the retention elements adjacent the spaced edge portions 27. The intervening section 29 between those deformed portions carrying the edge portions 27 is slightly less deformed to improve the biting action of the edge portions 27.

A valve stem opening 30 is provided in the body 14 as is conventional. The valve stem opening 30 can be located, as shown, between an adjacent pair of extensions 16 or it can be located symmetrically with one of them, as desired.

What is claimed as new is:

1. A wheel cover for a vehicle wheel having a tire rim comprising: a relatively thin sheet metal body of a size to substantially cover the wheel and having an integral annular, axially directed flange bent from the peripheral edge of the body, said flange being of a diameter slightly less than the inner diameter of the rim, and having a plurality of extensions along the free edge thereof; and a plurality of retention elements struck from each of said extensions with each retention element having a plurality of spaced edge portions for bitingly engaging the inner surface of said rim when the wheel cover is applied thereto, each of said retention element extensions being located along an arc the radius of which is greater than the radius of said flange in unstressed condition whereby the retention elements on each extension are increasingly urged into said biting engagement with said rim.

2. A wheel cover for a vehicle wheel having a tire rim comprising: a relatively thin sheet metal body of a size to substantially cover the wheel and having an integral annular, axially directed flange bent from the peripheral edge of the body, said flange being of a diameter slightly less than the inner diameter of the rim, and having a plurality of extensions along the free edge thereof, and having the marginal portion of each extension turned inwardly; and a plurality of retention elements struck from each of said extensions outwardly of said marginal portion thereof with each retention element having a plurality of spaced edge portions for bitingly engaging the inner surface of said rim when the wheel cover is applied thereto, each of said retention element extensions being located along an arc the radius of which is greater than the radius of said flange in unstressed condition whereby the retention elements on each extension are increasingly urged into said biting engagement with said rim.

3. A wheel cover for a vehicle wheel having a tire rim comprising: a relatively thin sheet metal body of a size to substantially cover the wheel and having an integral annular, axially directed flange bent from the peripheral edge of the body, said flange being of a diameter slightly less than the inner diameter of the rim, and having a plurality of extensions along the free edge thereof; and a plurality of retention elements struck from each of said extensions with each retention element having a plurality of spaced edge portions for bitingly engaging the inner surface of said rim when the wheel cover is applied thereto, there being a stress relieving opening at each end of the line along which each retention element is severed from its extension, each of said retention element extensions being located along an arc the radius of which is greater than the radius of said flange in unstressed condition whereby the retention elements on each extension are increasingly urged into said biting engagement with said rim.

4. A wheel cover for a vehicle wheel having a tire rim comprising: a relatively thin sheet metal body of a size to substantially cover the wheel and having an integral annular, axially directed flange bent from the peripheral edge of the body, said flange being of a diameter slightly less than the inner diameter of the rim, and having a plurality of extensions along the free edge thereof, and having the marginal portion of each extension turned inwardly; and a plurality of retention elements struck from each of said extensions outwardly of said marginal portion thereof with each retention element having a plurality of spaced edge portions for bitingly engaging the inner surface of said rim when the wheel cover is applied thereto, there being a stress relieving opening at each end of the line along which each retention element is severed from its extension, each of said retention element extensions being located along an arc the radius of which is greater than the radius of said flange in unstressed condition whereby the retention elements on each extension are increasingly urged into said biting engagement with said rim.

5. A wheel cover for a vehicle wheel having a tire rim comprising: a relatively thin sheet metal body of a size to substantially cover the wheel and having an integral annular, axially directed flange bent from the peripheral edge of the body, said flange being of a diameter slightly less than the inner diameter of the rim, and having a plurality of extensions along the free edge thereof; and a plurality of retention elements struck from each of said extensions with each retention element having a plurality of spaced edge portions for bitingly engaging the inner surface of said rim when the wheel cover is applied thereto, those portions of each retention element adjacent said edge portions thereof having a slight concave curvature, each of said retention element extensions being located along an arc the radius of which is greater than the radius of said flange in unstressed condition whereby the retention elements on each extension are increasingly urged into said biting engagement with said rim.

6. A wheel cover for a vehicle wheel having a tire rim comprising: a relatively thin sheet metal body of a size to substantially cover the wheel and having an integral annular, axially directed flange bent from the peripheral edge of the body, said flange being of a diameter slightly less than the inner diameter of the rim, and having a plurality of extensions along the free edge thereof; and a plurality of retention elements struck from each of said extensions with each retention element having a plurality of spaced edge portions for bitingly engaging the inner surface of said rim when the wheel cover is applied thereto, those portions of said flange between the retention element carrying extensions being flat bottomed cut away sections, each of said retention element extensions being located along an arc the radius of which is greater than the radius of said flange in unstressed condition whereby the retention elements on each extension are increasingly urged into said biting engagement with said rim.

7. A wheel cover for a vehicle wheel having a tire rim comprising: a relatively thin sheet metal body of a size to substantially cover the wheel and having an integral annular, axially directed flange bent from the peripheral edge of the body, said flange being of a diameter slightly less than the inner diameter of the rim, and having a plurality of extensions along the free edge thereof, and having the marginal portion of each extension turned inwardly; and a plurality of retention elements struck from each of said extensions outwardly of said marginal portion thereof with each retention element having a plurality of spaced edge portions for bitingly engaging the inner surface of said rim when the wheel cover is applied thereto, there being a stress relieving opening at each end of the line along which each retention element is severed from its extension, those portions of each retention element adjacent said edge portions thereof having a slight concave curvature, those portions of said flange between the retention element carrying extensions being flat bottomed cut away sections, each of said retention element extensions being located along an arc the radius of which is greater than the radius of said flange in unstressed condition whereby the retention elements on each extension are increasingly urged into said biting engagement with said rim.

References Cited by the Examiner

UNITED STATES PATENTS

| 2,725,257 | 11/1955 | Maurer | 301—37 |
| 2,984,518 | 5/1961 | Lyon | 301—37 |
| 3,071,416 | 1/1963 | Leich | 301—37 |
| 3,145,061 | 8/1964 | Demrick | 301—37 |

FOREIGN PATENTS 564,740  10/1958  Canada.

BENJAMIN HERSH, *Primary Examiner.*

RICHARD J. JOHNSON, *Examiner.*